Oct. 31, 1933.   G. H. HUNT ET AL   1,932,896

BRAKE OPERATING MECHANISM

Filed Dec. 11, 1929

INVENTOR
GEORGE H. HUNT
JOHN E. DOWNS
BY
M. W. McConkey
ATTORNEY

Patented Oct. 31, 1933

1,932,896

UNITED STATES PATENT OFFICE

1,932,896

BRAKE OPERATING MECHANISM

George H. Hunt, South Bend, and John E. Downs, Indianapolis, Ind., assignors to Bendix Brake Company, Chicago, Ill., a corporation of Illinois Application December 11, 1929. Serial No. 413,163

5 Claims. (Cl. 188—78)

This invention relates to brake operating mechanism and is illustrated as embodied in a bearing through which the brake operating shaft runs. It is especially intended for use in an operating shaft support bracket which is slidably mounted to permit compensation for uneven wear of the shoes on the two sides of the operating shaft or cam. The main object of the invention is to obviate all chances of binding of the shaft due to this shifting movement of the bracket. The operating shaft often extends through the shiftable bracket at one end and into a fixed socket at the other end. When the bracket shifts to compensate for wear, it ceases to be exactly in line with the fixed socket and hence there is a relative twist between the bracket and the shaft. A main feature of the invention is the inclusion of a spherical bearing in the bracket to permit the shaft to swivel with respect to the bracket.

In the drawing in which two embodiments of this invention are shown:

Figure 1:
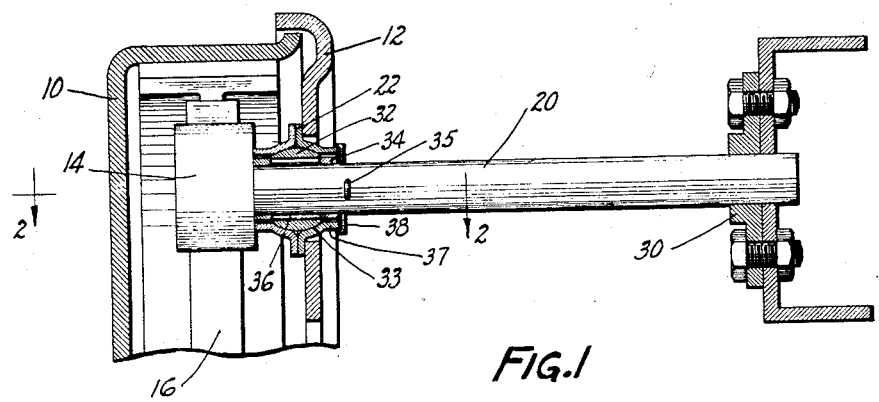
Figure 1 is a vertical sectional view of one embodiment of this invention in which a roller bearing is used with the socket shown diagrammatically.

The brake mechanism is supported within the brake drum 10 by a backing plate 12 and consists of any well known type of brake, but preferably having one or more fixed anchors circumferentially spaced from the actuator in back of the cam 14. Two brake shoes 16 and 18 may contact with and be actuated by this cam. The cam is mounted on the operating shaft 20 which extends through the backing plate and is carried on a special bracket 22 which is held in the backing plate by the bolts 24 or other suitable means which is are customarily mounted in slots 26 as shown. During the course of time, one of the shoes will often wear more quickly than the other. It is necessary that the cam 14 shift toward one shoe sufficiently to compensate for the difference in wear or it will fail to exert equal thrusts on both shoes. The slots 26 are provided to permit this, the bracket 22, cam 14 and shaft 20 shifting as a unit the necessary amount.

As the inner end of the shaft 20 is often mounted on a fixed socket 30, the shaft 20 cannot move with pure translation, but must rotate slightly about the socket 30 as a pivot. With the ordinary type of bearing in bracket 22, there would be no yielding in this bracket to permit such pivotal movement. As a consequence, there is a tendency for the shaft 20 to twist in its bearing in bracket 22 and in extreme cases to bind. This, of course, results in uneven wear and gives considerable trouble in the adjustment and operation of the brake. To overcome this difficulty, we have provided in the bracket 22 a bearing member 32 which on its outer side has been given a spherical shape and which is supported in a spherically shaped socket 33 in the bracket 22, as clearly shown in the drawing.

Figure 2:
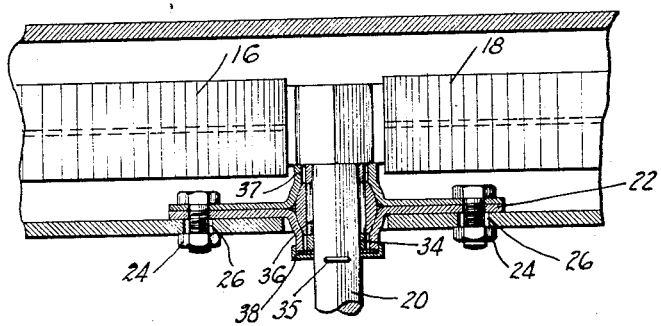
Figure 2 is a horizontal section along the line 2—2 of Figure 1.
Figure 3:
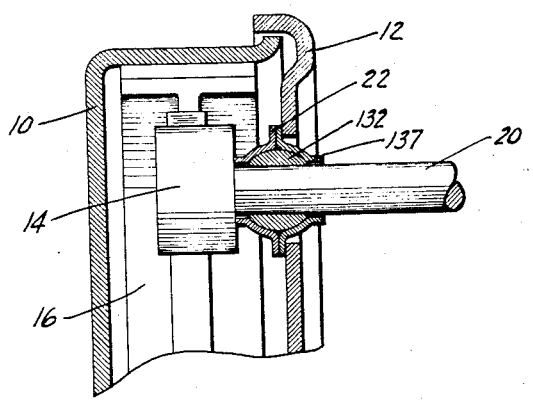
Figure 3 is a vertical sectional view of another embodiment of this invention in which a plain bearing is used.

The bearing may consist of either the plain type of bearing 132 shown in Figure 3 or the roller type of bearing 32 shown in Figures 1 and 2, or any other type desired. In the plain type of bearing (Figure 3), the socket for the bearing is preferably flanged, as shown at 137, with sufficient clearance around the shaft to permit the necessary swiveling. When the roller bearing type is used, rings 34 (Figure 2) may be provided at the ends of the rollers 36 as desired. Sufficient clearance is left between these rings and flanges 37 to permit the swiveling. A cover plate 38 may be provided in either case and may be held on in any suitable manner as by passing a cotter pin 35 through the shaft 20.

As will be seen from the drawing and the above description, the bracket 22 can now slide to compensate for differential wear of the shoes without any danger of binding in the bearing 31. This is because when such shifting takes place, the rod 20 and bearing 31 or 32 swivels in the bracket 22, thus permitting the shaft 20 to rotate about the fixed socket 30 without setting up strains. If desired, a similar bearing may be provided in the socket 30, although this is not ordinarily necessary.

While two illustrative embodiments of our invention have been described in detail, it is not our intention to limit the scope of the invention to those particular embodiments or otherwise than by the terms of the appended claims.

We claim:

1. Brake operating mechanism including an operating shaft, a support therefor, said support including a bearing having rolling elements, said bearing being so constructed and arranged as to be movable as a unit in the plane of said support and also rotatable about an axis in said plane.

2. A brake mechanism comprising a drum, a backing plate, friction means, an actuating means, an operating shaft for said actuating means, a support for said shaft mounted on said backing plate and including a bearing constituting a plurality of rollers, a member of spherical outer shape engaging said rollers, and a spherical socket in which said member is movable.

3. A brake mechanism comprising a drum, a friction element, a backing plate, a bearing rotatably and slidably mounted on said backing plate, actuating means for said friction element positioned within said drum, and an operating shaft extending uninterruptedly through said bearing into said drum and connected to said actuating means.

4. Brake mechanism including friction means, actuating means associated therewith, said actuating means being operated by a shaft, two spaced supports for said shaft, one of which is laterally shiftable with respect to the other, and a bearing carrying said shaft through one of said supports, said shaft and bearing being swivelly mounted in said support.

5. A brake mechanism comprising a drum, a friction element positioned in said drum, a backing plate, a bracket having a spherically shaped socket mounted on said backing plate, a spherically shaped bearing mounted therein and provided with a cylindrical passage therethrough, an actuating means for said friction element positioned within said drum, and an operating shaft extending uninterruptedly through said passage into said drum and connected with said actuating means.

GEORGE H. HUNT.
JOHN E. DOWNS.